(12) United States Patent
Sakamoto et al.

(10) Patent No.: US 12,103,348 B2
(45) Date of Patent: Oct. 1, 2024

(54) VEHICLE

(71) Applicant: Honda Motor Co., Ltd., Tokyo (JP)

(72) Inventors: Tomokazu Sakamoto, Saitama (JP); Kazumasa Ozaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/173,764

(22) Filed: Feb. 23, 2023

(65) Prior Publication Data
US 2023/0294475 A1 Sep. 21, 2023

(30) Foreign Application Priority Data
Mar. 17, 2022 (JP) .................................. 2022-043159

(51) Int. Cl.
*B60G 17/019* (2006.01)

(52) U.S. Cl.
CPC .... *B60G 17/01908* (2013.01); *B60G 2300/24* (2013.01); *B60G 2400/0511* (2013.01); *B60G 2400/0512* (2013.01); *B60G 2500/30* (2013.01)

(58) Field of Classification Search
CPC .......... B60G 17/01908; B60G 2300/24; B60G 2400/0511; B60G 2400/0512; B60G 2500/30; A61G 5/1078; B62K 11/007
See application file for complete search history.

(56) References Cited

U.S. PATENT DOCUMENTS

| | | | |
|---|---|---|---|
| 9,073,399 B1 * | 7/2015 | Richter | B60G 17/0165 |
| 10,926,756 B2 * | 2/2021 | Dastous | B60L 58/21 |
| 2007/0152427 A1 * | 7/2007 | Olsen | B60L 15/20 |
| | | | 280/649 |
| 2012/0172169 A1 * | 7/2012 | Gomi | B62K 15/00 |
| | | | 475/197 |
| 2014/0067177 A1 * | 3/2014 | Kobashi | B62K 11/007 |
| | | | 701/22 |
| 2015/0196441 A1 * | 7/2015 | Mulhern | A61G 5/1078 |
| | | | 180/170 |
| 2016/0101664 A1 * | 4/2016 | Richter | A61G 5/1081 |
| | | | 701/49 |
| 2018/0001729 A1 * | 1/2018 | Goffer | B60G 17/01908 |
| 2018/0111655 A1 * | 4/2018 | Inada | B62M 13/00 |
| 2021/0251826 A1 * | 8/2021 | Takenaka | B62J 1/28 |
| 2022/0133558 A1 * | 5/2022 | Campbell | B62K 11/007 |
| | | | 180/6.5 |
| 2022/0133559 A1 * | 5/2022 | Brewer | B62J 45/414 |
| | | | 180/6.5 |

FOREIGN PATENT DOCUMENTS

WO 2019244444 12/2019

* cited by examiner

*Primary Examiner* — Jason D Shanske
*Assistant Examiner* — Shams Dhanani
(74) *Attorney, Agent, or Firm* — JCIPRNET

(57) ABSTRACT

A vehicle includes a vehicle body frame, a vehicle body tilt sensor, a drive unit, and a seat. The vehicle body tilt sensor is provided at the vehicle body frame and detects a tilt angle of the vehicle body frame. The drive unit is coupled to the vehicle body frame and moves the vehicle body frame by inverted pendulum control based on the tilt angle detected by the vehicle body tilt sensor. The seat includes a seat body and a leg part. The seat is capable of being raised and lowered between a low position at which the leg part is in contact with a floor surface and a high position at which the leg part separates from the floor surface, and the seat is elastically coupled to the vehicle body frame. A seat tilt sensor which detects a tilt angle of the seat is provided at the seat.

12 Claims, 8 Drawing Sheets

VEHICLE

CROSS-REFERENCE TO RELATED APPLICATION

This application claims the priority benefit of Japan application serial no. 2022-043159, filed on Mar. 17, 2022. The entirety of the above-mentioned patent application is hereby incorporated by reference herein and made a part of this specification.

BACKGROUND

Technical Field

The disclosure relates to a mobile body capable of moving according to movement of the center of gravity of an occupant.

Related Art

A mobile body capable of moving according to movement of the center of gravity of an occupant is conventionally known (e.g., Patent Document 1: International Publication No. 2019/244444). The mobile body includes a movement operation part that is movable in all directions on a floor surface, a base body attached to the movement operation part, an occupant riding part attached to the base body via a connecting mechanism, and a plurality of auxiliary wheels connected to the occupant riding part.

The connecting mechanism includes an elastic structure for allowing the occupant riding part to swing elastically with respect to the base body, and a lifting mechanism for enabling raising and lowering the occupant riding part with respect to the base body. When each auxiliary wheel rises from the floor surface by the lifting mechanism from the state in which the auxiliary wheels are grounded, based on a measured value of a tilt sensor provided at the base body, movement control (inverted pendulum control) is performed on the movement operation part to balance the center of gravity of the entire mobile body in a same manner as a mass point of an inverted pendulum.

In the mobile body in Patent Document 1, in the state in which the auxiliary wheels are grounded, inverted pendulum control is not performed on the movement operation part, and the occupant riding part and the base body are connected by the elastic structure. Therefore, even when the auxiliary wheels are grounded, the tilt angle of the base body does not match the tilt angle of the floor surface, which makes it difficult to acquire the tilt angle of the floor surface.

SUMMARY

An embodiment of the disclosure provides a vehicle (1) including a vehicle body frame (2), a vehicle body tilt sensor (7), a drive unit (3), and a seat (4). The vehicle body tilt sensor is provided at the vehicle body frame and detects a tilt angle of the vehicle body frame. The drive unit is coupled to the vehicle body frame and moves the vehicle body frame along a floor surface by inverted pendulum control based on the tilt angle detected by the vehicle body tilt sensor. The seat includes a seat body (15) on which a user sits and a leg part (24, 27) extending downward. The seat is capable of being raised and lowered between a low position at which the leg part is in contact with the floor surface and a high position at which the leg part separates from the floor surface, and the seat is elastically coupled to the vehicle body frame. A seat tilt sensor (28) which detects a tilt angle of the seat is provided at the seat.

According to the above configuration, it is possible to accurately acquire a tilt angle of a floor surface in a vehicle including a vehicle body frame, a drive unit that causes the vehicle body frame to travel by inverted pendulum control, and a seat that is elastically connected to the vehicle body frame.

DESCRIPTION OF THE EMBODIMENTS

Figure 1:
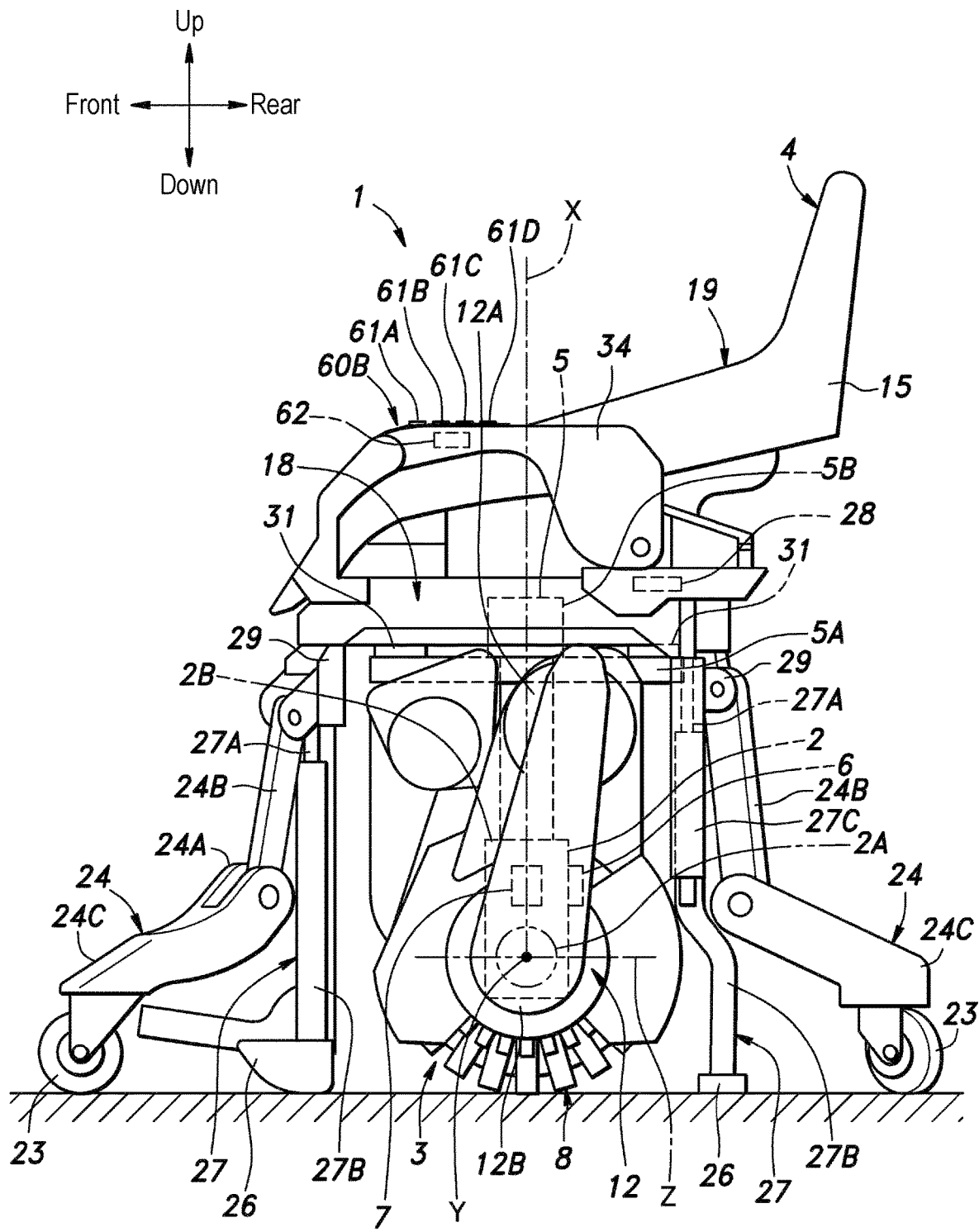
FIG. 1 is a side view of a vehicle when a seat is in a low position stop state, as viewed from the left side.

Embodiments of the disclosure acquire a tilt angle of a floor surface accurately in a vehicle including a vehicle body frame, a drive unit that causes the vehicle body frame to travel by inverted pendulum control, and a seat that is elastically connected to the vehicle body frame, and in turn, contribute to the development of sustainable transport systems.

An embodiment of the disclosure provides a vehicle (1) including a vehicle body frame (2), a vehicle body tilt sensor (7), a drive unit (3), and a seat (4). The vehicle body tilt sensor is provided at the vehicle body frame and detects a tilt angle of the vehicle body frame. The drive unit is coupled to the vehicle body frame and moves the vehicle body frame along a floor surface by inverted pendulum control based on the tilt angle detected by the vehicle body tilt sensor. The seat includes a seat body (15) on which a user sits and a leg part (24, 27) extending downward. The seat is capable of being raised and lowered between a low position at which the leg part is in contact with the floor surface and a high position at which the leg part separates from the floor surface, and the seat is elastically coupled to the vehicle body frame. A seat tilt sensor (28) which detects a tilt angle of the seat is provided at the seat.

According to this embodiment, since the leg part of the seat is in contact with the floor surface when the seat is at the low position, the tilt angle of the floor surface can be acquired by the seat tilt sensor.

In the above embodiment, the vehicle may include a lifting apparatus (5) and a control device (6). The lifting apparatus raises and lowers the seat with respect to the vehicle body frame. The control device controls drive of the lifting apparatus. The control device may determine whether drive of the lifting apparatus is possible based on a detection result of the seat tilt sensor.

According to this embodiment, when the seat is at the low position, it is determined whether the seat may be raised by the lifting apparatus based on the tilt angle acquired by the seat tilt sensor. Therefore, it is possible to more accurately determine whether raise is allowed based on the tilt angle of the floor surface.

In the above embodiment, the control device may be configured to determine that the seat tilt sensor and the vehicle body tilt sensor are normal when a difference between the tilt angle of the seat acquired by the seat tilt sensor and the tilt angle of the vehicle body frame acquired by the vehicle body tilt sensor is equal to or less than a predetermined threshold, and determine that any one of the seat tilt sensor and the vehicle body tilt sensor is malfunctioning when the difference between the tilt angle of the seat acquired by the seat tilt sensor and the tilt angle of the vehicle body frame acquired by the vehicle body tilt sensor is greater than the predetermined threshold.

According to this embodiment, it is possible to determine malfunction of any one of the vehicle body tilt sensor and the seat tilt sensor with a simple configuration.

In the above embodiment, the vehicle body frame may be provided with two drive units. The drive units may each have a disk shape arranged coaxially with each other, and be supported by the vehicle body frame rotatably around an axis (Y). The vehicle body tilt sensor may be positioned on a virtual line (X) that passes through a middle of the two drive units and is perpendicular to the axis.

According to this embodiment, the tilt angle of the vehicle body frame can be acquired appropriately.

In the above embodiment, the seat tilt sensor may be provided at a position away from the virtual line.

According to this embodiment, it is possible to improve the detection accuracy of the tilt angle detected by the seat tilt sensor.

In the above embodiment, the seat tilt sensor may be provided at the seat body.

According to this embodiment, it is possible to appropriately acquire the tilt angle of the floor surface even when a movable leg part is used.

An embodiment of a vehicle according to the disclosure will be described below with reference to the drawings. In this embodiment, the vehicle is configured as an inverted pendulum type vehicle.

As shown in FIG. 1, a vehicle 1 is a single-occupant vehicle and is movable in all directions on a floor surface according to movement of the center of gravity of a seated user. Hereinafter, a configuration of the vehicle 1 will be described with the front-rear, left-right, and up-down directions defined based on the orientation of the user seated on the vehicle 1. However, the descriptions of the front-rear, left-right, and up-down directions serve to facilitate illustration, and the disclosure is not limited by the descriptions of these directions.

Figure 2:
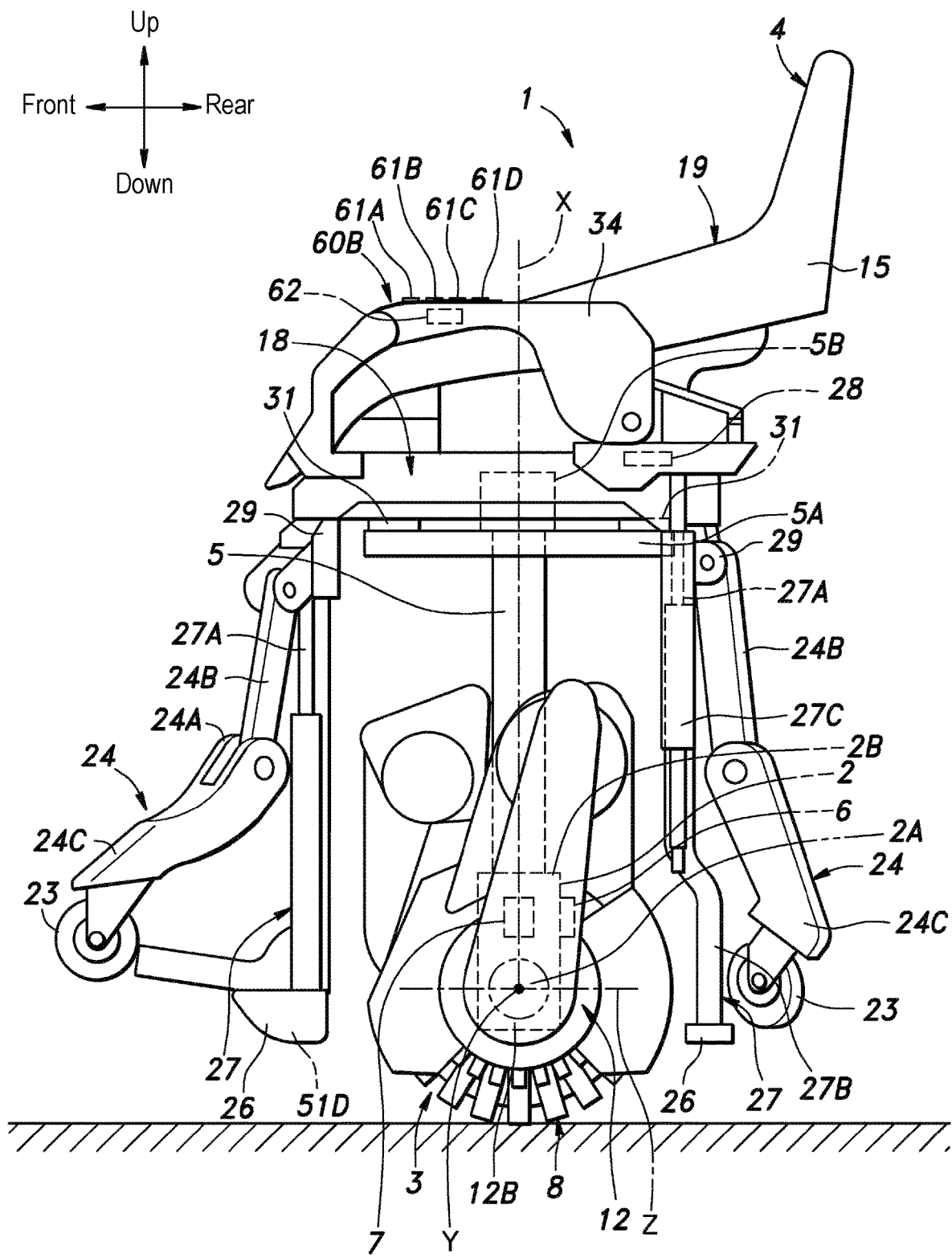
FIG. 2 is a side view of the vehicle when the seat at a high position, as viewed from the left side.

As shown in FIG. 1 and FIG. 2, the vehicle 1 includes a vehicle body frame 2, at least one drive unit 3 provided at the vehicle body frame 2 and movable on the floor surface, a seat 4 arranged above the vehicle body frame 2 and supporting the hips of the user, a lifting apparatus 5 provided between the vehicle body frame 2 and the seat 4, and a control device 6 that controls the drive unit 3 and the lifting apparatus 5.

The vehicle body frame 2 includes a lower frame 2A extending in the left-right direction and an upper frame 2B extending upward from substantially the center of the lower frame 2A. A lower end of the upper frame 2B is connected to a substantially central part of the lower frame 2A in the left-right direction. The upper frame 2B is pivotally supported to the lower frame 2A at its lower end to be capable of swinging around an axis Z extending in the front-rear direction (see FIG. 8). A vehicle body tilt sensor 7 is provided at an upper part of the upper frame 2B.

The vehicle body tilt sensor 7 detects a tilt angle (hereinafter referred to as a vehicle body tilt angle) of the vehicle body frame 2 with respect to the horizontal plane. The vehicle body tilt sensor 7 may be configured by a known device that sequentially measures (estimates) the vehicle body tilt angle by detecting acceleration and angular velocity in three axial directions and performing strapdown type arithmetic processing. However, the vehicle body tilt sensor 7 is not limited to this form. For example, the vehicle body tilt sensor 7 may be a sensor that detects the vehicle body tilt angle based on changes in the direction of gravitational acceleration with respect to the vehicle body frame 2. In that case, the vehicle body tilt sensor 7 may be configured by a known device based on MEMS technology.

In this embodiment, the vehicle body tilt angle includes two angles, i.e., a roll angle of the vehicle body frame 2 and a pitch angle of the vehicle body frame 2. Each is defined with reference (0 degrees) to the time when mounted in a state in which the vehicle 1 is stationary on the horizontal plane and the user is not seated.

Figure 8:
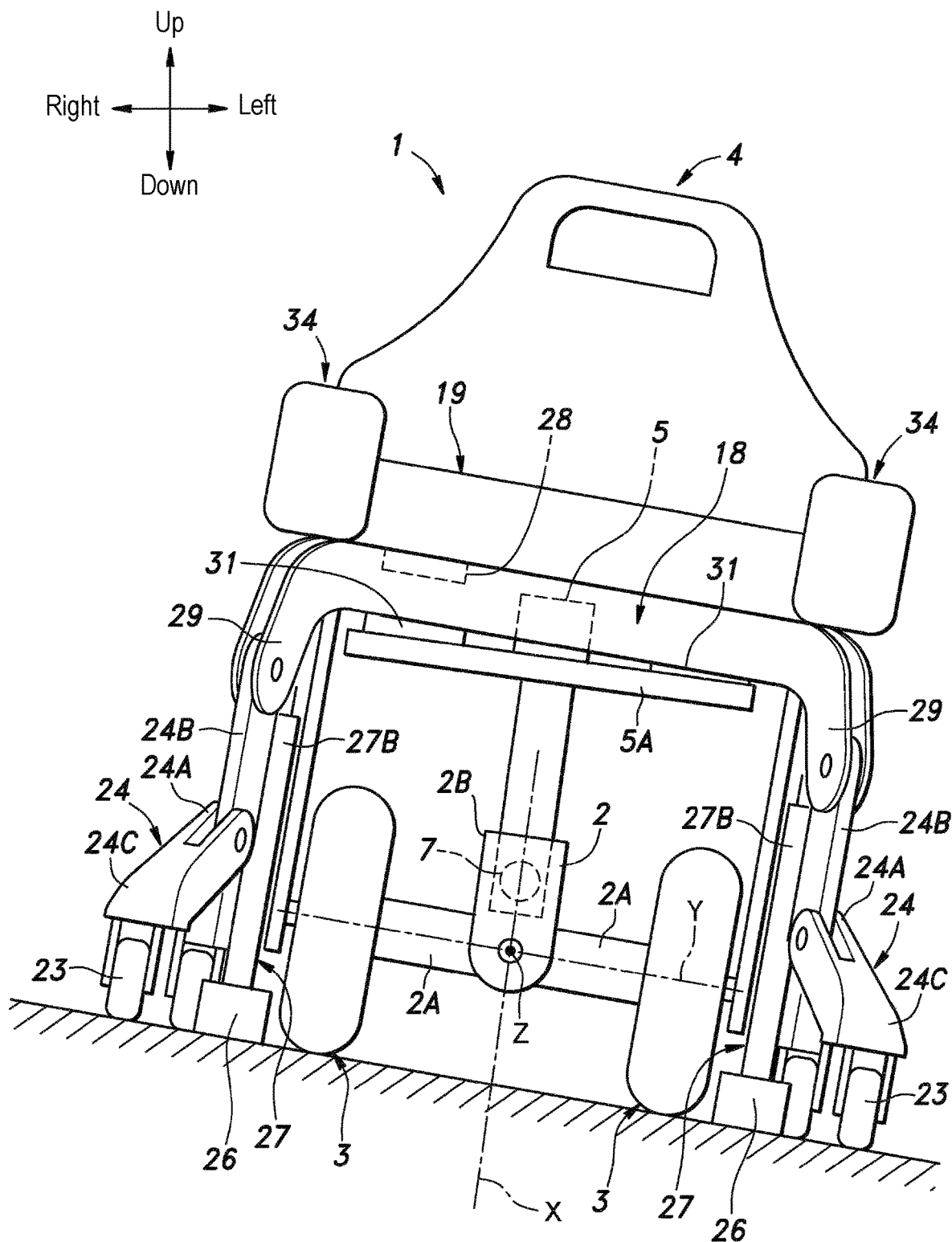
FIG. 8 is a schematic view showing the vehicle on a left-right tilted surface when the seat is in the low position stop state.

The vehicle 1 includes a pair of left and right drive units 3 (see FIG. 8). The drive units 3 are respectively provided at left and right side parts of the vehicle body frame 2. The drive unit 3 has a disk shape in a side view. The drive units 3 are arranged to be coaxial around an axis Y extending in the left-right direction. The drive units 3 are arranged to be left-right symmetric with respect to the upper frame 2B and are respectively supported by the lower frame 2A rotatably around the axis Y.

As shown in FIG. 1, the vehicle body tilt sensor 7 is positioned on a virtual line X that passes through the middle of the two drive units 3 and intersects the axis Y. When the vehicle 1 is positioned on the horizontal plane, the virtual line X is perpendicular to the axis Y and the axis Z and extends in the vertical direction.

Figure 3:
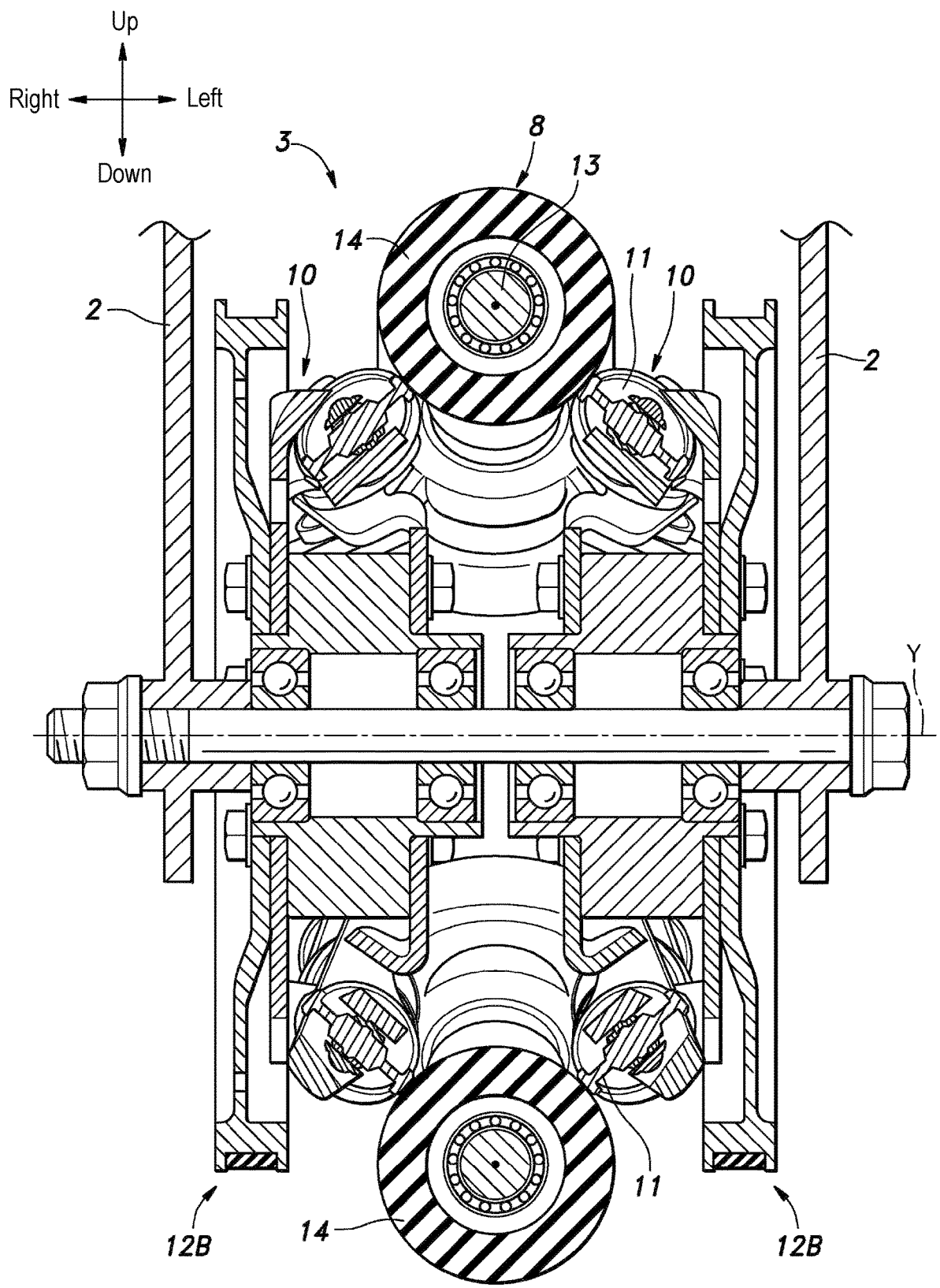
FIG. 3 is a cross-sectional view of a drive unit.

In this embodiment, each drive unit 3 is a friction-type drive device. As shown in FIG. 3, the drive units 3 each include a pair of drive disks 10 rotatably supported by the vehicle body frame 2, a plurality of drive rollers 11 rotatably supported by each of the drive disks 10, a drive wheel 8 in an annular shape arranged between the left and right drive disks 10 and in contact with the drive rollers 11, and a pair of actuators 12 that respectively rotate the pair of drive disks 10 independently. The pair of drive disks 10 are arranged coaxially with each other, and their rotation axes extend in the left-right direction. As shown in FIG. 1, each actuator 12 includes an electric motor 12A and a transmission mechanism 12B that transmits the rotational force of the electric motor 12A to the corresponding drive disk 10. The transmission mechanism 12B may be, for example, a belt transmission mechanism. The electric motor 12A may be arranged above the drive disk 10.

The drive wheel 8 has an annular shape and is arranged coaxially with the drive disks 10 between the pair of drive disks 10. Further, as shown in FIG. 1, the drive wheel 8 is in contact with the plurality of drive rollers 11 and is rotatable around a central axis and around an annular axis. The drive wheel 8 includes, for example, a core 13 in an annular shape and a plurality of driven rollers 14 rotatably supported by the core 13. Each driven roller 14 is supported by the core 13 rotatably around the axis of the core 13 in an annular shape. Each driven roller 14 receives a load from the drive disks 10 and rotates with respect to the core 13.

When the pair of drive disks 10 rotate in the same direction at the same rotational speed, the drive wheel 8 rotates in the same direction at the same rotational speed as the drive disks 10. When a difference is generated in the rotational direction or the rotational speed of the pair of drive disks 10, the driven rollers 14 of the drive wheel 8 rotate with respect to the core 13. Accordingly, the drive unit 3 can generate a propulsive force in the left-right direction with respect to the floor surface.

As shown in FIG. 1, the seat 4 includes a seat body 15 on which a user sits, a plurality of first legs 24, and a plurality of second legs 27. The seat body 15 includes a seat frame 18 and a pad 19 supported at an upper part of the seat frame 18. The first leg 24 and the second leg 27 each form a leg part extending downward from the seat body 15. In this embodiment, the seat 4 has four first legs 24 and four second legs 27.

Figure 4:
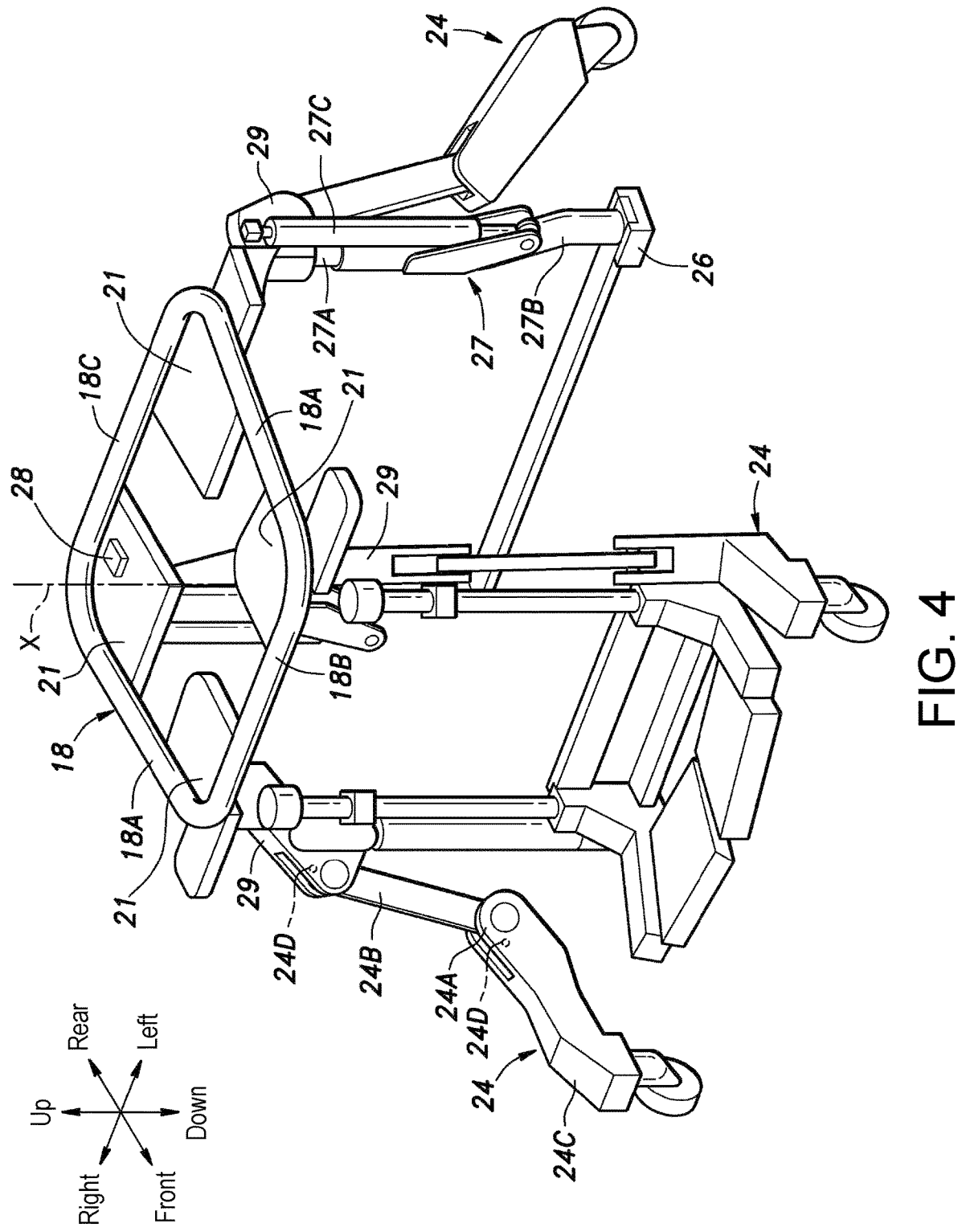
FIG. 4 is a perspective view of a seat frame assembly.

As shown in FIG. 4, the seat frame 18 has a rectangular frame shape in a top view. The seat frame 18 includes a pair of left and right side frames 18A extending in the front-rear direction, a front frame 18B connecting respective front ends of the side frames 18A, and a rear frame 18C connecting respective rear ends of the side frames 18A. Support pieces 21 which extend inward are provided at four corners of the seat frame 18, respectively.

A seat tilt sensor 28 is provided at the seat body 15. Unlike the vehicle body tilt sensor 7, the seat tilt sensor 28 is provided at a position away from the virtual line X. In this embodiment, the seat tilt sensor 28 is provided at one of the four corners of the seat frame 18. The seat tilt sensor 28 may be provided at any of the four corners, and for example, it may be provided at the support piece 21 positioned at either the left or right corner on the rear side, among the four corners of the seat frame 18.

The seat tilt sensor 28 detects a tilt angle (hereinafter referred to as a seat tilt angle) of the seat frame 18. Like the vehicle body tilt sensor 7, the seat tilt sensor 28 may be configured by a known device that sequentially measures (estimates) the seat tilt angle by detecting acceleration and angular velocity in three axial directions and performing strapdown type arithmetic processing. However, the seat tilt sensor 28 is not limited to this form. For example, the seat tilt sensor 28 may be a sensor that detects the seat tilt angle based on changes in the direction of gravitational acceleration with respect to the vehicle body frame 2. In that case, the seat tilt sensor 28 may be configured by a known device based on MEMS technology. Alternatively, the seat tilt sensor 28 may be a sensor that detects only a specific angle, and the detection method is not limited to the strapdown method or the method based on changes in the direction of gravitational acceleration.

In this embodiment, the seat tilt angle includes two angles, i.e., a roll angle of the seat frame 18 and a pitch angle of the seat frame 18. Each is defined with reference (0 degrees) to the time when mounted in a state in which the vehicle 1 is stationary on the horizontal plane and the user is not seated.

As shown in FIG. 1, the pad 19 is made of a cushioning material and is arranged above the seat frame 18. The pad 19 is arranged above the support pieces 21 and is supported by the seat frame 18 via the support pieces 21. An upper surface of the pad 19 forms a seating surface that supports the hips of the user.

As shown in FIG. 4, the first leg 24 and the second leg 27 are each coupled to the seat frame 18 via a leg support part 29 provided at the four corners of the seat frame 18. One first leg 24 and one second leg 27 are connected to one leg support part 29.

The first leg 24 is rotatably coupled to the leg support part 29 at its upper end. The first leg 24 is rotatable between a retracted position arranged close to the vehicle body frame 2 and an unfolded position more laterally away from the vehicle body frame 2 than the retracted position. A biasing member (not shown) is provided between the vehicle body frame 2 and the first leg 24 to bias the first leg 24 at the unfolded position to the retracted position.

The first legs 24 each include a first leg upper part 24B, a first leg lower part 24C rotatably connected to the first leg upper part 24B via a joint 24A, and a roller 23 provided at a lower end of the first leg lower part 24C. The roller 23 has a substantially cylindrical shape. The roller 23 is arranged so that its central axis is substantially horizontal, and is connected to the lower end of the first leg lower part 24C so that its central axis is rotatable. The first leg lower part 24C may support the roller 23 so that its axis is rotatable around a vertical axis. When the rollers 23 respectively abut with the floor surface, the seat 4 is movable along the floor surface.

The second leg 27 is fixed to the leg support part 29 at its upper end. The second leg 27 is configured to be expandable and contractable in the up-down direction. The second leg 27 includes a second leg upper part 27A, a second leg lower part 27B, and an abutment member 26.

The second leg upper part 27A is fixed to the leg support part 29 at its upper end and extends downward. The second leg lower part 27B protrudes downward from the second leg upper part 27A and is supported movably in the up-down direction. The abutment member 26 is provided at the lower end of the second leg lower part 27B. The abutment member 26 may have a higher flexibility than the second leg lower part 27B. Further, the abutment member 26 may have a higher coefficient of friction than the second leg lower part 27B. The abutment member 26 may be made of rubber or elastomer, for example. With grounding of the abutment member 26, the vehicle 1, which is grounded via the rollers 23, can be kept in a stop state.

By contacting the floor surface, the abutment member 26 applies a frictional force to the vehicle 1, which would move due to rotation of the rollers 23, and keeps the vehicle 1 in the stop state.

A biasing member is interposed between the second leg upper part 27A and the second leg lower part 27B to bias the second leg lower part 27B downward with respect to the second leg upper part 27A. The biasing member may include a compression coil spring. In this embodiment, the biasing member is arranged inside the second leg lower part 27B and abuts with a lower end of the second leg upper part 27A. Accordingly, the second leg 27 is expandable and contractable according to an upward load applied to its lower end.

The lifting apparatus 5 is an apparatus for raising and lowering the seat 4. As shown in FIG. 1 and FIG. 2, the lifting apparatus 5 is coupled to the vehicle body frame 2 and the seat frame 18. The lifting apparatus 5 displaces the seat frame 18 in the up-down direction with respect to the vehicle body frame 2 by expanding and contracting in the up-down direction.

The lifting apparatus 5 includes a movable body 5A and a drive device 5B coupled to the vehicle body frame 2 and moving the movable body 5A upward and downward with respect to the vehicle body frame 2. The drive device 5B may include a ball screw mechanism and an electric motor that drives the ball screw mechanism.

An elastic member 31 is provided between the movable body 5A and the seat 4. The elastic member 31 has cushioning properties and deforms according to an applied load.

The elastic member 31 may be made of rubber or the like, for example. The elastic member 31 tilts the seat frame 18 with respect to the movable body 5A according to a load from the user, a tilt of the floor surface, etc. Thus, the lifting apparatus 5 is directly coupled to the vehicle body frame 2 and is coupled to the seat frame 18 via the elastic member 31. Accordingly, the seat 4 is elastically coupled to the vehicle body frame 2 and is capable of being raised and lowered. The seat 4 is capable of being tilted with respect to the vehicle body frame 2.

An operation panel 60B is provided on left and right sides of the seat 4. The operation panel 60B is provided with a power switch 61A, a lift switch 61B, a movement direction switch 61C, and a travel mode switching switch 61D. The switches are each connected to the control device 6.

Figure 5:
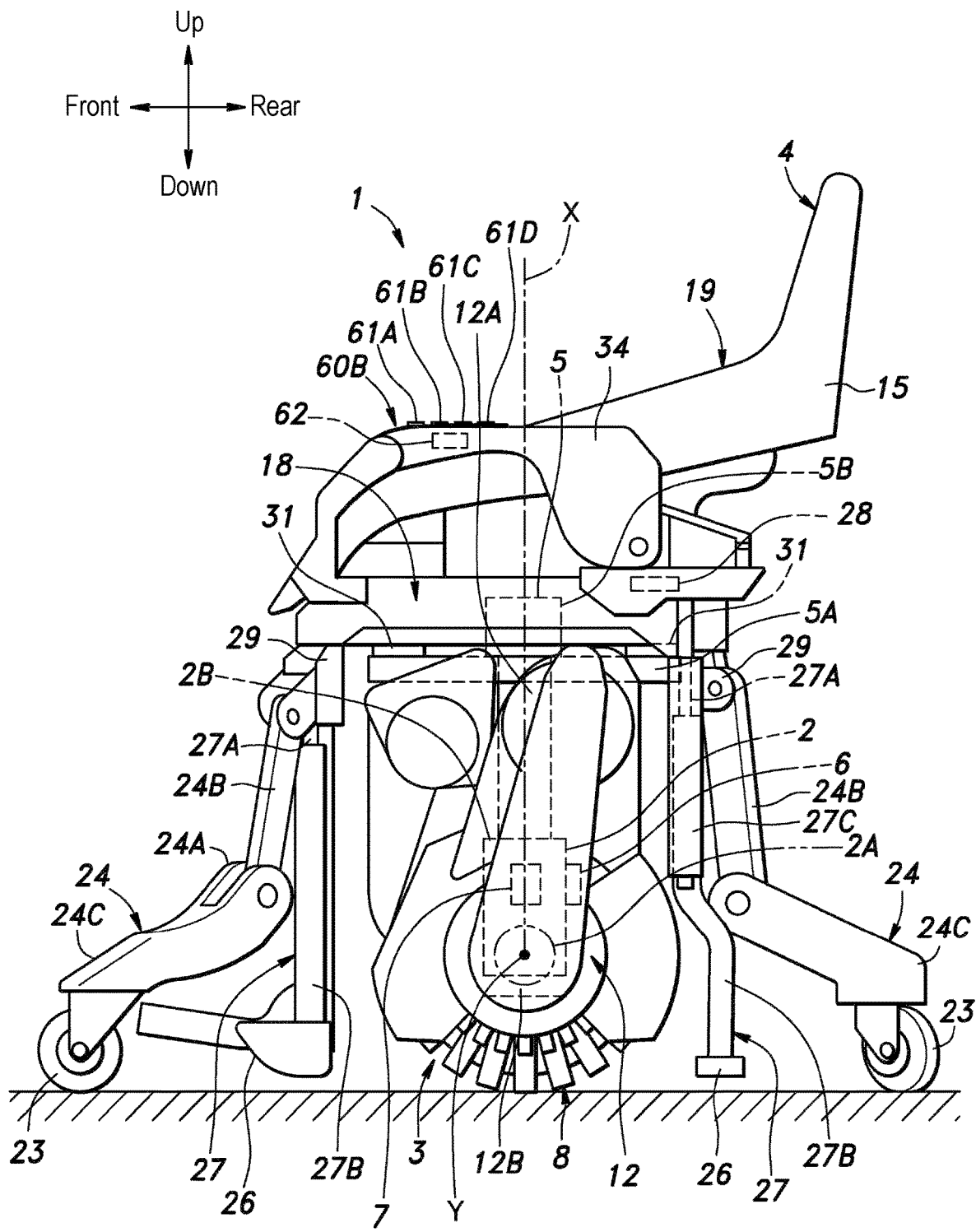
FIG. 5 is a side view of the vehicle when the seat is at a low position travelable state, as viewed from the left side.

A pair of left and right levers 34 are provided at the seat frame 18. The levers 34 are positioned on left and right outer sides of the operation panels 60B. When the user operates one of the left and right levers 34, as shown in FIG. 5, each second leg 27 contracts upward and each abutment member 26 separates from the floor surface. This state is referred to as a low position travelable state. In the low position travelable state, the user may cause the vehicle 1 to travel by operating the movement direction switch 61C. When the user returns the lever 34 to an initial position, each second leg 27 extends and the abutment members 26 each contact the floor surface to prevent movement of the vehicle 1.

The control device 6 is provided at an inner part or a rear part of the vehicle body frame 2. The control device 6 is configured by a computer including a central processing unit (CPU), memories such as a RAM and a ROM, and storage devices such as an HDD and an SSD. The control device 6 may be connected to a notification device 62 that notifies the user. The notification device 62 may be, for example, a speaker that notifies the user by voice. The notification device 62 may be provided at any location as long as it is provided at a position at which notification to the user is possible. For example, the notification device 62 may be provided inside the operation panel 60B.

In addition, a battery for operating the control device 6, the lifting apparatus 5, and the drive units 3 may be supported at the rear part of the vehicle body frame 2.

As shown in FIG. 1, when the vehicle 1 is stopped without operating the lever 34, since each second leg 27 is expandable and contractable, the abutment members 26 are respectively in contact with the floor surface. Due to the abutment of the abutment members 26, the vehicle 1 is kept in a stopped state without movement. Such a state in which the abutment members 26 are in contact with the floor surface and the vehicle 1 is stopped is referred to as a low position stop state.

When the power switch 61A is turned on and the lever 34 is operated, as shown in FIG. 5, the second legs 27 each contract upward, and the abutment members 26 each separate from the floor surface. Accordingly, the rollers 23 and the drive units 3 are both brought into abutment with the floor surface. When the movement direction switch 61C is operated, the control device 6 controls the drive units 3 according to the operation and causes the vehicle 1 to travel. Such a state in which the vehicle 1 travels on the floor surface with the rollers 23 and the drive units 3 both abutting with the floor surface is referred to as a low position travelable state. However, although FIG. 5 shows that the second legs 27 separate from the floor surface, the embodiment is not limited thereto, and for example, the second legs 27 may slidably abut with the floor surface via rollers (not shown) or the like.

When the power switch 61A is turned on and the lift switch 61B is turned on, the control device 6 performs a determination process of determining whether the seat 4 may be raised by determining whether a predetermined condition is satisfied, and setting a value corresponding to a flag. The predetermined condition is a condition required for causing the vehicle 1 to travel by raising the seat 4 and performing inverted pendulum control, such as a tilt of the floor surface not being too large. Then, when the flag is set to a value indicating that the seat 4 may be changed to the high position, as shown in FIG. 2, the control device 6 drives the lifting apparatus 5 to raise the seat frame 18 with respect to the vehicle body frame 2, and the rollers 23 and the abutment members 26 are separated from the floor surface. At this time, only the drive wheels 8 of the left and right drive units 3 are grounded, and the posture of the vehicle 1 is maintained by the inverted pendulum control based on the tilt angle detected by the vehicle body tilt sensor 7. In this state, the control device 6 detects displacement of the center of gravity of the vehicle 1 caused by weight shifting of the user, and controls the drive units 3 to cause the vehicle 1 to travel. That is, the drive units 3 move the vehicle body frame 2 along the floor surface by inverted pendulum control based on the tilt angle of the vehicle body frame 2 detected by the vehicle body tilt sensor 7. Such a state in which the abutment members 26 and the rollers 23 separate from the floor surface and only the left and right drive units 3 are grounded is referred to as a high position.

Figure 6:
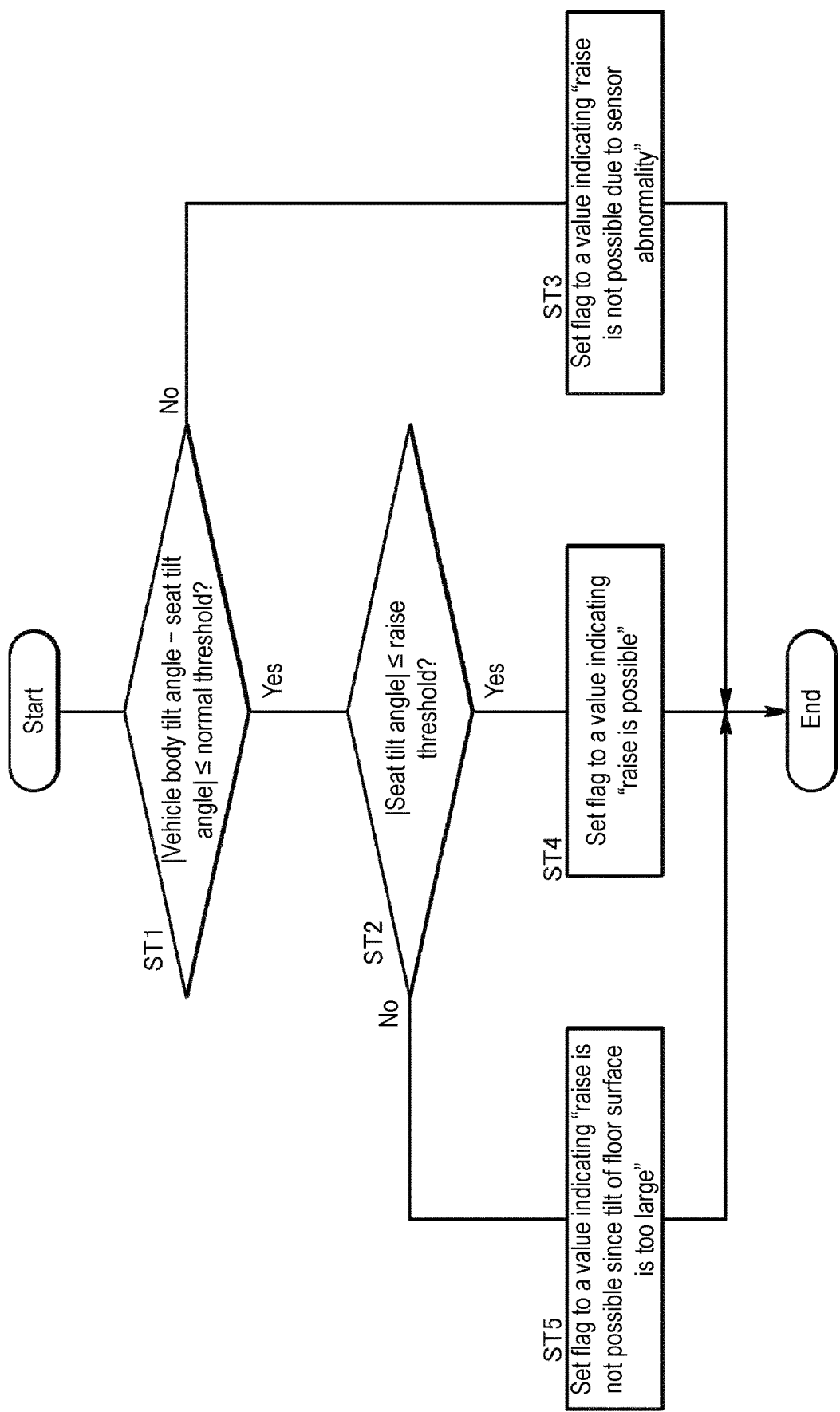
FIG. 6 is a flowchart of a determination process.

Next, details of the determination process performed by the control device 6 will be described with reference to FIG. 6.

First, in step ST1 of the determination process, the control device 6 acquires a vehicle body tilt angle which is a detection result from the vehicle body tilt sensor 7, and acquires a seat tilt angle which is a detection result from the seat tilt sensor 28. Afterwards, the control device 6 calculates a difference (absolute difference) between the vehicle body tilt angle and the seat tilt angle, and determines whether the difference is equal to or less than a predetermined normal threshold.

Specifically, when a difference between the roll angle of the vehicle body tilt angle and the roll angle of the seat tilt angle and a difference between the pitch angle of the vehicle body tilt angle and the pitch angle of the seat tilt angle are both equal to or less than the normal threshold, the control device 6 determines that the difference between the vehicle body tilt angle and the seat tilt angle is equal to or less than the normal threshold, and executes step ST2. When at least one of the difference between the roll angle of the vehicle body tilt angle and the roll angle of the seat tilt angle, and the difference between the pitch angle of the vehicle body tilt angle and the pitch angle of the seat tilt angle is greater than the normal threshold, step ST3 is executed.

In step ST2, the control device 6 determines whether the seat tilt angle is equal to or less than a predetermined raise threshold. Specifically, when the magnitude of the roll angle of the seat tilt angle is equal to or less than the raise threshold and the magnitude of the pitch angle of the seat tilt angle is equal to or less than the raise threshold, the control device 6 determines that the seat tilt angle is equal to or less than the predetermined raise threshold, and executes step ST4. When at least one of the magnitude of the roll angle of the seat tilt angle and the magnitude of the pitch angle of the seat tilt angle is greater than the raise threshold, the control device 6 executes step ST5.

In step ST3, the control device 6 determines that an abnormality is present in at least one of the vehicle body tilt sensor 7 and the seat tilt sensor 28, and sets the flag to a value indicating that raise of the seat 4 is not allowed due to an abnormality present in the sensor. At this time, the control device 6 may output, from the notification device 62 (speaker), a notification that an abnormality is present in the tilt sensor. When the setting of the flag and the output from the notification device 62 are completed, the control device 6 ends the determination process.

In step ST4, the control device 6 sets the flag to a value indicating that the seat 4 may be raised. At this time, the control device 6 may output, from the notification device 62 (speaker), a notification that the seat 4 is to be raised. When the setting of the flag and the output from the notification device 62 are completed, the control device 6 ends the determination process.

In step ST5, the control device 6 sets the flag to a value indicating that raise of the seat 4 is not allowed since the tilt of the floor surface is too large. At this time, the control device 6 may output, from the notification device 62 (speaker), a notification that the tilt of the floor surface is too large. When the setting of the flag and the output from the notification device 62 are completed, the control device 6 ends the determination process.

Next, the effects of the vehicle 1 configured in this manner will be described.

The vehicle 1 includes the vehicle body frame 2 and the seat frame 18. When the vehicle 1 is stopped, the first legs 24 and the second legs 27 are respectively in a grounded state. In the case where the vehicle body frame 2 and the seat frame 18 are fixed and integrated and the first legs 24 and the second legs 27 are respectively grounded, since the load from the floor surface is transmitted to the first legs 24 and the second legs 27 and this load is transmitted to the vehicle body frame 2 via the seat frame 18, it is not easy to perform inverted pendulum control on the vehicle body frame 2.

Therefore, the inventors of this application have conceived of suppressing the transmission of the load from the first legs 24 and the second legs 27 to the vehicle body frame 2 by elastically coupling between the vehicle body frame 2 and the seat frame 18. By elastically coupling the vehicle body frame 2 to the seat frame 18 and connecting the two in a displaceable manner, the inverted pendulum control on the vehicle body frame 2 can be performed before the first legs 24 and the second legs 27 separate from the floor surface.

However, the inventors of this application have found that even in the case where the vehicle body frame 2 and the seat frame 18 are elastically coupled, if the tilt angle of the floor surface is equal to or greater than a predetermined value, the deformable range of the elastic member 31 would be exceeded, and it would be difficult to stand the lower frame 2A of the vehicle body frame 2. Therefore, the inventors of this application have attempted providing a sensor in the vehicle 1 to accurately detect the angle of the floor surface.

Figure 7:
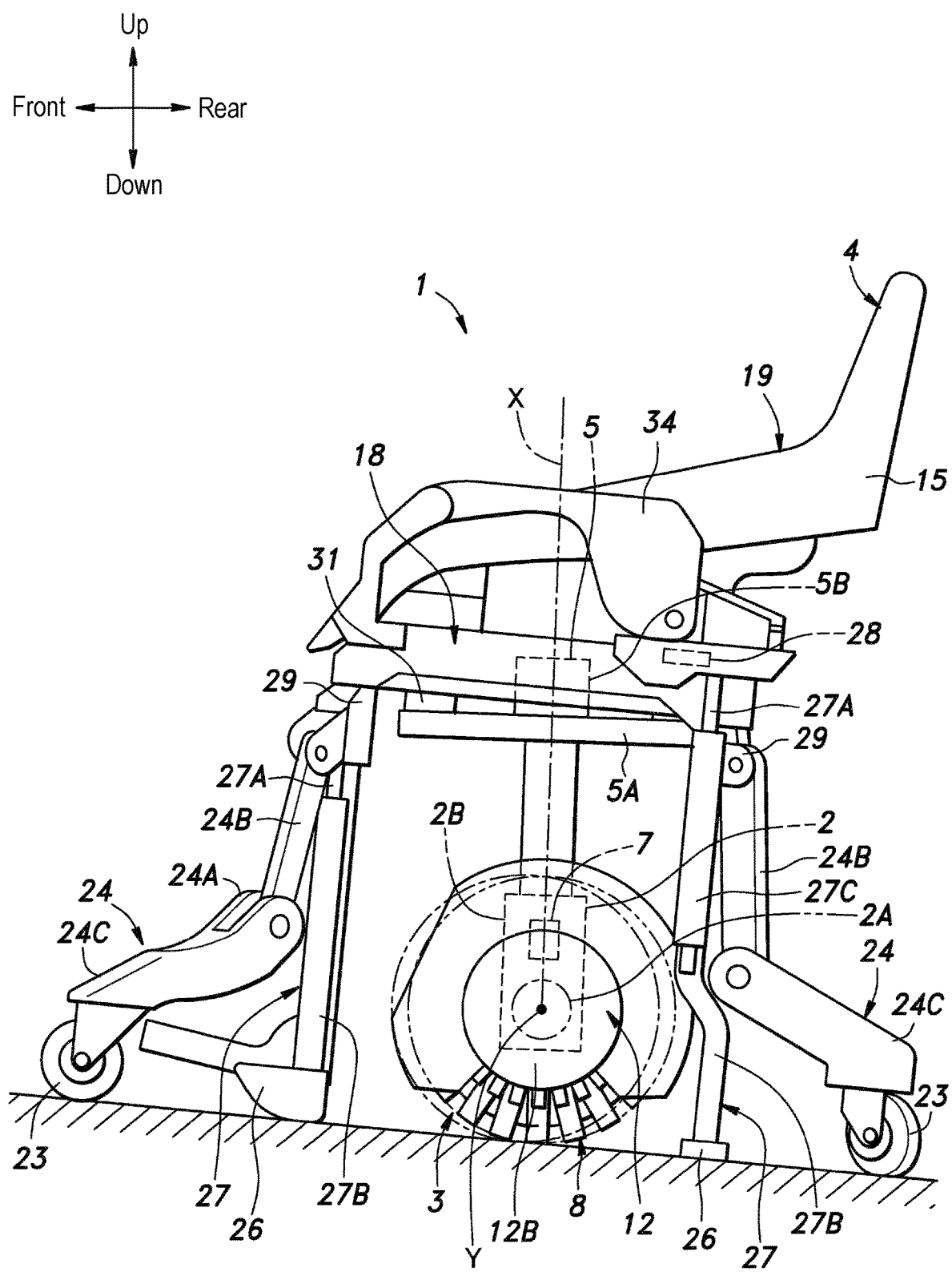
FIG. 7 is a schematic view showing the vehicle on a front-rear tilted surface when the seat is in the low position stop state.

FIG. 7 and FIG. 8 are schematic views showing the vehicle body frame 2 and the seat 4 when the vehicle 1 is stopped on a tilted surface. As shown in FIG. 7 and FIG. 8, when the vehicle 1 is stopped, the first legs 24 and the second legs 27 are respectively grounded, and the seat 4 is landed. However, since the rotation of the drive units 3 is not restricted, for example, the drive wheels 8 and the like may rotate due to gravity, and the upper frame 2B may tilt from an upright state. Therefore, when the vehicle 1 is stopped, the tilt angle of the vehicle body frame 2 and the tilt angle of the seat frame 18 may not match depending on the tilt angle of the floor surface.

When the seat 4 is at the low position, since the second legs 27 (and the first legs 24) are grounded, the tilt angle acquired by the seat tilt sensor 28 is the tilt angle of the floor surface. Thus, by providing the vehicle 1 with the seat tilt sensor 28 in addition to the vehicle body tilt sensor 7, the tilt angle of the floor surface can be detected more accurately when the vehicle 1 is stopped on a tilted surface.

Further, in the determination process, based on the tilt angle acquired by the seat tilt sensor 28, when the control device 6 determines that the tilt angle is equal to or less than the raise threshold, the flag is set to a value indicating that raise is possible, and the lifting apparatus 5 raises the seat 4. In this manner, since whether raise of the seat 4 is possible is determined not by the value of the vehicle body tilt sensor 7 but by the value of the seat tilt sensor 28, it is possible to determine whether the seat 4 can be raised based on the accurate tilt angle of the floor surface. Accordingly, it is possible to further enhance the safety of the vehicle 1 and contribute to the development of sustainable transport systems that are more sensitive to the needs of people in vulnerable states, especially those with disabilities and the elderly.

The inventors of this application have found that since such displacement of the vehicle body frame 2 is restricted by the deformation of the elastic member 31, the absolute value (magnitude) of the difference between the tilt angle of the vehicle body frame 2 and the tilt angle of the seat 4 is restricted within a normal threshold.

When the difference between the vehicle body tilt sensor 7 and the seat tilt sensor 28 is greater than the normal threshold ("No" in ST1), the flag is set to a value indicating that the tilt sensor is abnormal and raise of the seat 4 is not allowed (ST3). Thus, with a simple configuration using two tilt sensors, i.e., the vehicle body tilt sensor 7 and the seat tilt sensor 28, it is possible to easily determine an abnormality of any one of the two tilt sensors. Further, since raise of the seat 4 is prohibited when an abnormality is present in any one of the tilt sensors, the safety of the vehicle 1 is enhanced.

The vehicle body tilt sensor 7 is positioned on a virtual line X passing through the middle of the two drive units 3. The control device 6 performs inverted pendulum control on the drive units 3 so that the lower frame 2A of the vehicle body frame 2 becomes vertical based on the vehicle body tilt angle acquired by the vehicle body tilt sensor 7.

The seat frame 18 is connected to the vehicle body frame 2 via the elastic member 31. Therefore, since the tilt angle of the seat frame 18 does not match the tilt angle of the vehicle body frame 2, by providing the vehicle body frame 2 with the vehicle body tilt sensor 7 for controlling the drive units 3, the vehicle body frame 2 can be moved along the floor surface by the inverted pendulum control. Furthermore, by providing the vehicle body tilt sensor 7 on the virtual line X which passes through the middle of the two drive units 3 and is perpendicular to the axis Y when the vehicle 1 is placed on the horizontal plane, stable inverted pendulum control with the two drive units 3 becomes possible.

In the case where the seat tilt sensor 28 detects a seat tilt angle based on gravitational acceleration, the seat tilt sensor 28 may be provided at any position on the seat frame 18. In the case of the method of sequentially measuring (estimating) a seat tilt angle by detecting acceleration and angular velocity in three axial directions and performing strapdown type arithmetic processing, for example, the seat tilt sensor 28 may be arranged close to one of the four corners of the seat frame 18. Accordingly, the seat tilt sensor 28 is provided at a position away from the virtual line X. Therefore, compared to the case of being positioned on the virtual line X, the magnitudes of the detected axial acceleration and angular velocity are greater. Therefore, in the case of sequentially measuring (estimating) the seat tilt angle by using an acceleration sensor as the seat tilt sensor 28 and performing strapdown type arithmetic processing on the seat tilt angle, compared to the case of being positioned on the virtual line X, it is possible to improve the detection accuracy of the acquired seat tilt angle.

In the case where the seat tilt sensor 28 is provided at the first leg 24 or the second leg 27 which is movable, the seat tilt angle detected by the seat tilt sensor 28 may not reflect the tilt angle of the floor surface. In this embodiment, since the seat tilt sensor 28 is provided at the seat frame 18, i.e., at the seat body 15, the tilt angle of the floor surface can be acquired appropriately.

Although the specific embodiment has been described above, the disclosure is not limited to the above embodiment or modification examples and may be extensively modified and implemented.

In the above embodiment, when the difference between the roll angle of the vehicle body tilt angle and the roll angle of the seat tilt angle, and the difference between the pitch angle of the vehicle body tilt angle and the pitch angle of the seat tilt angle are both equal to or less than the normal threshold, the control device 6 determines that the difference between the vehicle body tilt angle and the seat tilt angle is equal to or less than the normal threshold. However, the disclosure is not limited to this aspect. The control device 6 may determine that the vehicle body tilt sensor 7 and the seat tilt sensor 28 are both normal when the difference between the roll angle of the vehicle body tilt angle and the roll angle of the seat tilt angle is equal to or less than a predetermined first normal threshold, and the difference between the pitch angle of the vehicle body tilt angle and the pitch angle of the seat tilt angle is equal to or less than a predetermined second normal threshold. The first normal threshold and the second normal threshold may be different from each other. For example, the first normal threshold may be set to be smaller than the second normal threshold.

In the above embodiment, when the roll angle of the seat tilt angle is equal to or less than the raise threshold and the pitch angle of the seat tilt angle is equal to or less than the raise threshold, the control device 6 determines that the seat tilt angle is equal to or less than the predetermined raise threshold. However, the disclosure is not limited to this aspect. The control device 6 may calculate the tilt angle of the seat 4 itself based on both the roll angle and the pitch angle, and determine that the seat tilt angle is less than or equal to the predetermined raise threshold when the calculated tilt angle of the seat 4 is equal to or less than the raise threshold.

What is claimed is:

1. A vehicle comprising:
   a vehicle body frame;
   a vehicle body tilt sensor which is provided at the vehicle body frame and detects a tilt angle of the vehicle body frame;
   a drive unit which is coupled to the vehicle body frame and moves the vehicle body frame along a floor surface by inverted pendulum control based on the tilt angle detected by the vehicle body tilt sensor; and
   a seat comprising a seat body on which a user sits and a leg part extending downward, the seat being capable of being raised and lowered between a low position at which the leg part is in contact with the floor surface and a high position at which the leg part separates from the floor surface, and the seat being elastically coupled to the vehicle body frame,
   wherein a seat tilt sensor which detects a tilt angle of the seat is provided at the seat.

2. The vehicle according to claim 1, comprising:
   a lifting apparatus which raises and lowers the seat with respect to the vehicle body frame; and
   a control device which controls drive of the lifting apparatus,
   wherein the control device determines whether drive of the lifting apparatus is possible based on a detection result of the seat tilt sensor.

3. The vehicle according to claim 2, wherein the control device is configured to:
   determine that the seat tilt sensor and the vehicle body tilt sensor are normal when a difference between the tilt angle of the seat acquired by the seat tilt sensor and the tilt angle of the vehicle body frame acquired by the vehicle body tilt sensor is equal to or less than a predetermined threshold, and
   determine that any one of the seat tilt sensor and the vehicle body tilt sensor is malfunctioning when the difference between the tilt angle of the seat acquired by the seat tilt sensor and the tilt angle of the vehicle body frame acquired by the vehicle body tilt sensor is greater than the predetermined threshold.

4. The vehicle according to claim 1, wherein the vehicle body frame is provided with two drive units,
   the drive units each have a disk shape arranged coaxially with each other, and are supported by the vehicle body frame rotatably around an axis, and
   the vehicle body tilt sensor is positioned on a virtual line that passes through a middle of the two drive units and is perpendicular to the axis.

5. The vehicle according to claim 4, wherein the seat tilt sensor is provided at a position away from the virtual line.

6. The vehicle according to claim 5, wherein the seat tilt sensor is provided at the seat body.

7. The vehicle according to claim 2, wherein the vehicle body frame is provided with two drive units,
   the drive units each have a disk shape arranged coaxially with each other, and are supported by the vehicle body frame rotatably around an axis, and
   the vehicle body tilt sensor is positioned on a virtual line that passes through a middle of the two drive units and is perpendicular to the axis.

8. The vehicle according to claim 7, wherein the seat tilt sensor is provided at a position away from the virtual line.

9. The vehicle according to claim 8, wherein the seat tilt sensor is provided at the seat body.

10. The vehicle according to claim 3, wherein the vehicle body frame is provided with two drive units,
    the drive units each have a disk shape arranged coaxially with each other, and are supported by the vehicle body frame rotatably around an axis, and
    the vehicle body tilt sensor is positioned on a virtual line that passes through a middle of the two drive units and is perpendicular to the axis.

11. The vehicle according to claim 10, wherein the seat tilt sensor is provided at a position away from the virtual line.

12. The vehicle according to claim 11, wherein the seat tilt sensor is provided at the seat body.

* * * * *